(12) United States Patent
Hsieh et al.

(10) Patent No.: US 10,228,734 B1
(45) Date of Patent: Mar. 12, 2019

(54) REMOVABLE HARD DISK CARRIER

(71) Applicants:Inventec (Pudong) Technology Corp., Shanghai (CN); Inventec Corporation, Taipei (TW)

(72) Inventors: Han-Chih Hsieh, Taipei (TW); Hsueh-Chan Li, Taipei (TW); Chih-Lung Liao, Taipei (TW); Chao-Chih Liu, Taipei (TW)

(73) Assignees: Inventec (Pudong) Technology Corp., Shanghai (CN); Inventec Corporation, Taipei (TW)

( * ) Notice: Subject to any disclaimer, the term of this patent is extended or adjusted under 35 U.S.C. 154(b) by 0 days.

(21) Appl. No.: 15/862,608

(22) Filed: Jan. 4, 2018

(30) Foreign Application Priority Data

Nov. 21, 2017 (CN) .......................... 2017 1 1165112

(51) Int. Cl.
| G06F 1/16 | (2006.01) |
| H05K 5/00 | (2006.01) |
| H05K 7/00 | (2006.01) |
| G06F 1/18 | (2006.01) |

(52) U.S. Cl.
CPC .................................... *G06F 1/187* (2013.01)

(58) Field of Classification Search
CPC .......... G06F 1/187; G06F 1/183; G06F 1/181; G06F 1/18
USPC ........................ 361/679.31–679.39, 724–727
See application file for complete search history.

(56) References Cited

U.S. PATENT DOCUMENTS

| 7,492,586 | B2* | 2/2009 | Peng | G11B 33/124 |
| | | | | 248/694 |
| 8,456,832 | B1* | 6/2013 | Brigham, Jr. | G06F 1/187 |
| | | | | 361/679.33 |
| 9,958,912 | B2* | 5/2018 | Chen | G06F 1/187 |
| 2008/0278856 | A1* | 11/2008 | Peng | G11B 33/124 |
| | | | | 360/244.3 |
| 2009/0103252 | A1* | 4/2009 | Peng | G11B 33/123 |
| | | | | 361/679.4 |
| 2009/0129009 | A1* | 5/2009 | Zhang | G11B 33/12 |
| | | | | 361/679.34 |

* cited by examiner

*Primary Examiner* — Anthony M Haughton
(74) *Attorney, Agent, or Firm* — Winston Hsu (57) ABSTRACT

A removable hard disk carrier includes an L-shaped support, a flexible support, and a side support. The flexible support is fixedly connected to an end portion of the L-shaped support. The side support is fixedly connected to an end portion of the flexible support and is detachably engaged with another end portion of the L-shaped support. Therein, after the side support is detachably engaged with the L-shaped support, the L-shaped support, the flexible support, and the side support form an accommodating space therebetween and can fix a hard disk in the accommodating space. When the side support and the L-shaped support are not engaged, the side support can move away from the L-shaped support due to the resilient deformation of the flexible support, so that the hard disk can be detached from the removable hard disk carrier.

9 Claims, 7 Drawing Sheets

REMOVABLE HARD DISK CARRIER

BACKGROUND OF THE INVENTION

1. Field of the Invention

The invention relates to a hard disk carrier, and especially relates to a removable hard disk carrier.

2. Description of the Prior Art

A general server is usually equipped with a plurality of hard disks for storing huge information. These hard disks are fixed on a frame of the server by screws. The attachment or detachment of the hard disks needs operators to implement by hand tools, which induces a problem of wasting of time. If the server is equipped with a lot of hard disks or the server needs a replacement for one or more of the hard disks frequently, the above problem will become worse. For this problem, there is a design on the market using a removable framework. In general, the design includes a hard disk carrier accommodating a hard disk, and a socket capable of quickly engaging with and quickly disengaging from the hard disk carrier. The structural feature of quick engagement and disengagement save the operator the time for replacing a hard disk. However, some hard disk carriers are carried out with directly fixing a hard disk on two side supports of the hard disk carrier by screws, so the attachment and detachment of the hard disk still needs hand tools. Furthermore, some hard disk carriers are carried out with rigid rectangular frame. It is not easy to place a hard disk on this hard disk carrier and generally needs screws for fixing the hard disk, so that the operator still needs to use hand tools to complete the attachment. Therefore, the attachment and detachment for the current hard disk carriers is still inconvenient and needs hand tools in principle.

SUMMARY OF THE INVENTION

An objective of the invention is to provide a removable hard disk carrier which uses a flexible support for the convenience of opening a fixing frame of the removable hard disk carrier and attaching a hard disk to the fixing frame or detaching the hard disk from the fixing frame.

A removable hard disk carrier according to the invention includes an L-shaped support, a flexible support, and a side support. The flexible support is fixedly connected to an end portion of the L-shaped support. The side support is fixedly connected to an end portion of the flexible support. The side support is detachably engaged with another end portion of the L-shaped support. Therein, when the side support and the L-shaped support are detachably engaged with each other, the L-shaped support, the flexible support, and the side support form an accommodating space therebetween and can fix a hard disk in the accommodating space. Thereby, the removable hard disk carrier according to the invention does not use a totally-rigid structure, which facilitates the attachment of the hard disk to the removable hard disk carrier and the detachment of the hard disk from the removable hard disk carrier. For example, when the side support is not engaged with the L-shaped support, the side support can depart away from the L-shaped support by elastically deforming the flexible support, so that the hard disk can be detached from the removable hard disk carrier. Afterwards, a replacement hard disk can be easily placed in the accommodating space. By restoration of the elastically deformed flexible support, the side support is engaged with the L-shaped support again for fixing the replacement hard disk. In addition, further, posts can be disposed on the side support and the portion of the L-shaped support opposite to the side support. When the hard disk is in the accommodating space and the side support is engaged with the L-shaped support, these posts can be inserted in to locking holes formed on two sides of the hard disk, so that the hard disk can be directly fixed on the removable hard disk carrier without screws, which further simplifies the detachment and attachment of the hard disk further.

These and other objectives of the present invention will no doubt become obvious to those of ordinary skill in the art after reading the following detailed description of the preferred embodiment that is illustrated in the various figures and drawings.

DETAILED DESCRIPTION

Please refer to FIG. 1 to FIG. 5. A removable hard disk carrier 1 of an embodiment according to the invention includes an L-shaped support 12, a flexible support 14, and a side support 16. An end portion 14a of the flexible support 14 is fixedly connected to an end portion 12a of the L-shaped support 12. An end portion 16a of the side support 16 is fixedly connected to another end portion 14b of the flexible support 14. Another end portion 16b of the side support 16 is detachably engaged with another end portion 12b of the L-shaped support 12. Therein, when the side support 16 and the L-shaped support 12 are detachably engaged with each other, the L-shaped support 12, the flexible support 14, and the side support 16 form an accommodating space 10 therebetween and can fix a hard disk 2 (shown by its profile in dashed lines in FIG. 1 and FIG. 2) in the accommodating space 10. Because the flexible support 14 is flexible and elastically deformable, when the side support 16 is not engaged with the L-shaped support 12, the side support 16 can depart away from the L-shaped support 12 by elastically deforming the flexible support 14, so that the hard disk 2 can be detached from the removable hard disk carrier 1 (or the accommodating space 10). Afterwards, a replacement hard disk can be easily placed in the accommodating space 10. By restoration of the elastically deformed flexible support 14, the end portion 16b of the side support 16 can approach the end portion 12b of L-shaped support 12, so as to make the side support 16 and the L-shaped support 12 engage with each other again for fixing the replacement hard disk. Therefore, the removable hard disk carrier 1 does not use a totally-rigid structure, which facilitates the attachment of the hard disk 2 to the removable hard disk carrier 1 and the detachment of the hard disk 2 from the removable hard disk carrier 1.

Further, in the embodiment, L-shaped support 12 includes a side supporting portion 122 and a front supporting portion 124. The side supporting portion 122 and the front supporting portion 124 are fixedly connected in an L-shaped form. Therein, the front supporting portion 124 includes a mount 1242 and an engaging structure 1244. The engaging structure 1244 is disposed on the mount 1242. The engaging structure 1244 includes an operation part 12442 and a restoration spring 12444. The operation part 12442 has a pivotal connection portion 12442*a*, a first engaging portion 12442*b*, and a pressing portion 12442*c*. The pivotal connection portion 12442*a* is pivotally connected to the mount 1242. The first engaging portion 12442*b* and the pressing portion 12442*c* are connected to the pivotal connection portion 12442*a* and are located at two opposite sides of the pivotal connection portion 12442*a*, so that the pivotal connection portion 12442*a* can be taken as a fulcrum by which the operation part 12442 can pivot. Furthermore, the restoration spring 12444 (e.g. a helix spring) is compressed to be disposed between the pressing portion 12442*c* and the mount 1242, so that the operation part 12442 tends to remain located at a specific status (or position). In practice, the restoration spring 12444 can be replaced with a torsion spring, two end portions of which abut against and between the pressing portion 12442*c* and the mount 1242 respectively, which also can perform the function as the above-mentioned helix spring does. The side support 16 has a second engaging portion 16*c*. The first engaging portion 12442*b* can be detachably engaged with the second engaging portion 16*c*.

Figure 1:
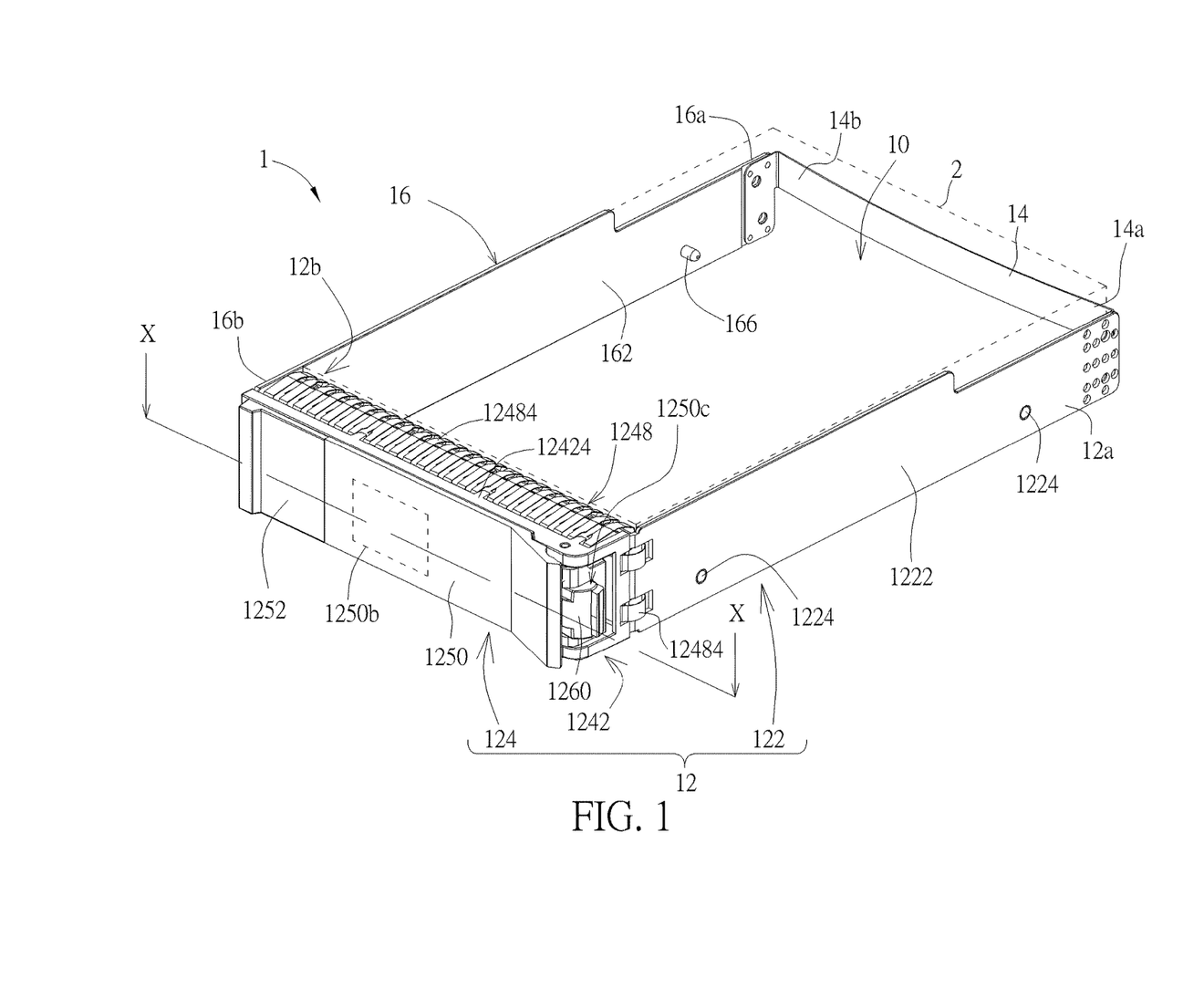
FIG. 1 is a schematic diagram illustrating a removable hard disk carrier of an embodiment according to the invention.
Figure 2:
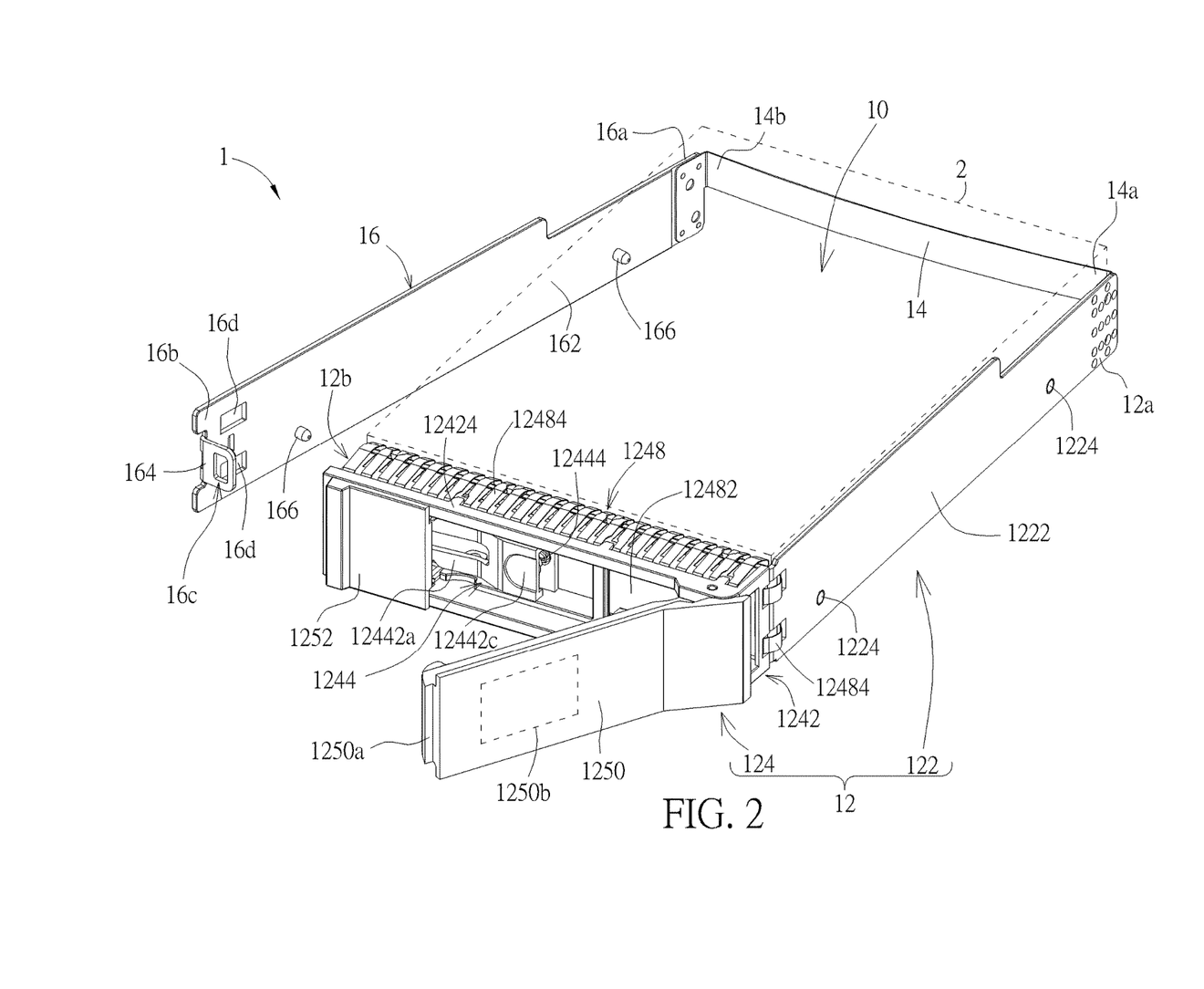
FIG. 2 is a schematic diagram illustrating the removable hard disk carrier in FIG. 1 that is at an open status.
Figure 3:
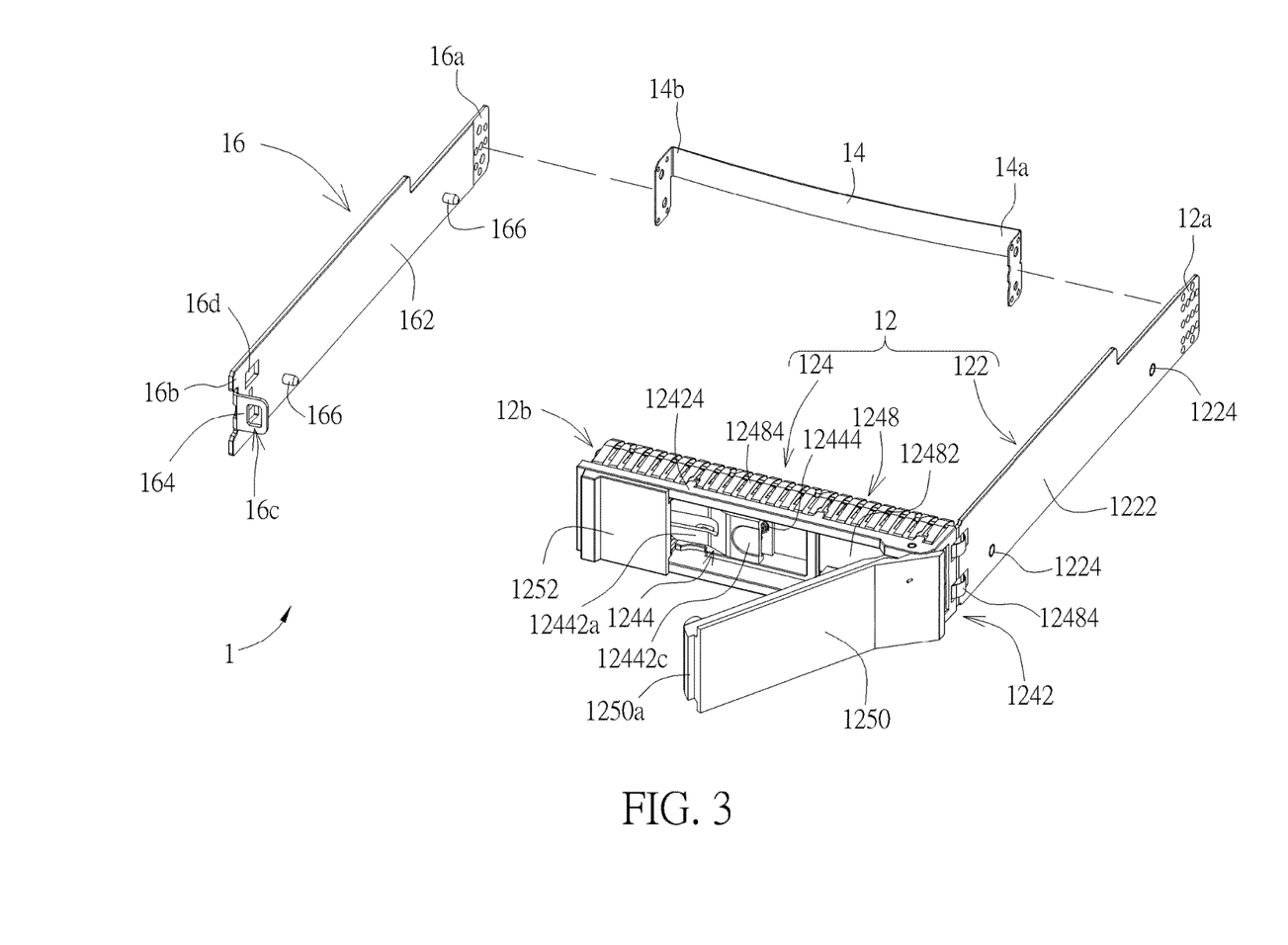
FIG. 3 is a partially exploded view of the removable hard disk carrier in FIG. 1.
Figure 4:
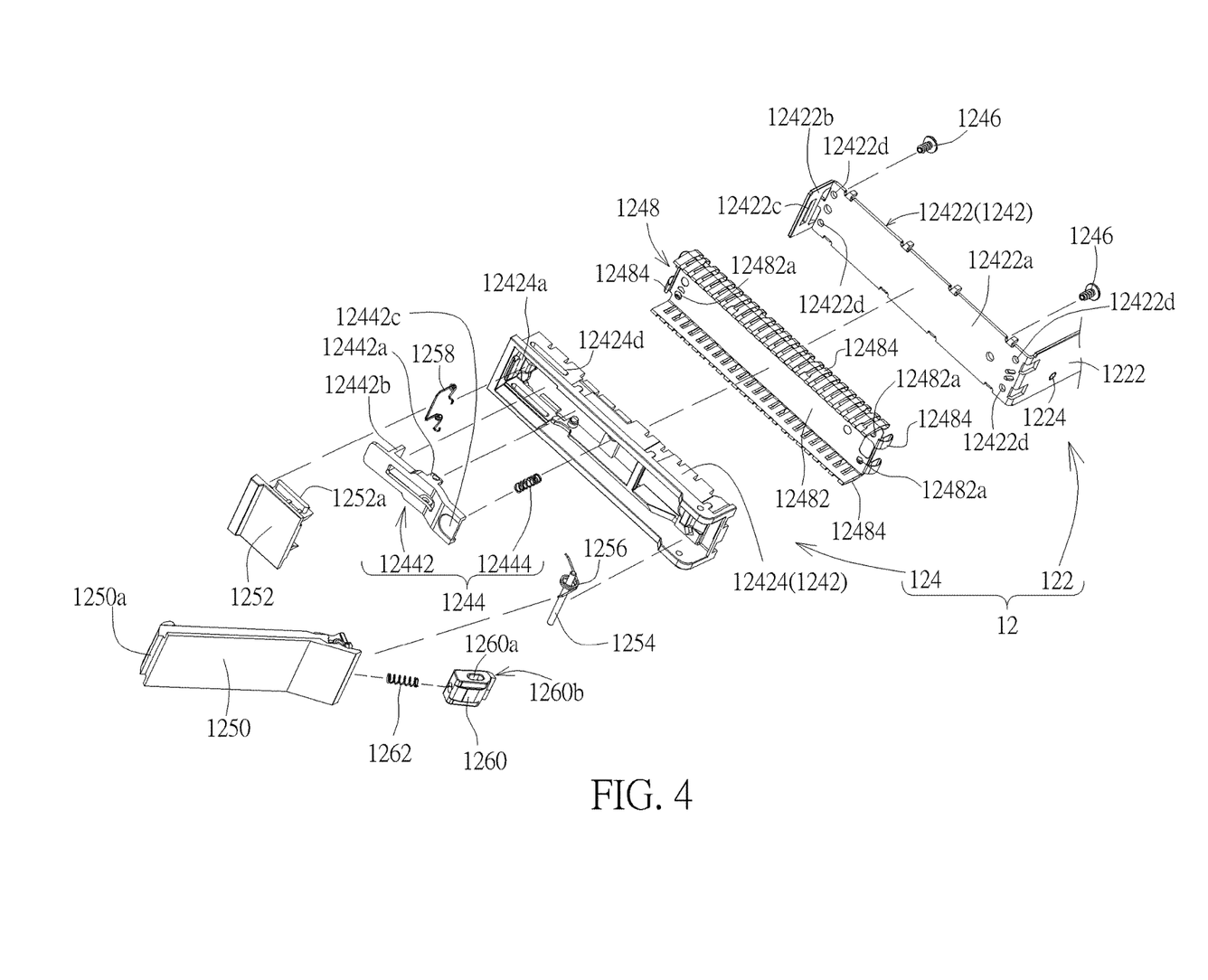
FIG. 4 is an exploded view of an L-shaped support of the removable hard disk carrier in FIG. 1.

In the embodiment, the first engaging portion 12442*b* is a hook, and the second engaging portion 16*c* is a slot; however, the invention is not limited thereto. For example, the first engaging portion 12442*b* can be realized by a slot while the second engaging portion 16*c* is realized by a hook. Furthermore, the operation part 12442 as a whole can be formed by a plastic injection part. The plastic injection part protrudes a protruding portion downward to form the hook. The side support 16 as a whole can be formed by a metal stamping part, which includes a main body 162 and a bent portion 164 bending and extending from an end portion of the main body 162. The bent portion 164 is taken as the second engaging portion 16*c* and thereon forms a through hole taken as the slot. However, the invention is not limited thereto. For example, the above protruding portion can be formed by an additional part (e.g. another metal part) embedded in the plastic injection part. The above bent end portion 16*b* can be formed by an additional part (e.g. a plastic part) sleeved on an end of the metal stamping part. In the embodiment, the first engaging portion 12442*b* has a slanted surface 12442*d* for guiding the first engaging portion 12442*b* to engage with the second engaging portion 16*c*.

Furthermore, in the embodiment, the mount 1242 includes a first metal frame 12422 and a plastic socket 12424. The plastic socket 12424 is held onto the first metal frame 12422. The first metal frame 12422 has a base plate portion 12422*a* and a side plate portion 12422*b*. The side plate portion 12422*b* has a through hole 12422*c*. The plastic socket 12424 has a through hole 12424*a* corresponding to the through hole 12422*c*, so that in the engagement of the side support 16 with the L-shaped support 12, the second engaging portion 16*c* passes through the through holes 12422*c* and 12424*a* to be detachably engaged with the first engaging portion 12442*b*. Therein, the plastic socket 12424 and the first metal frame 12422 are positioned by a plurality of positioning posts 12424*b* and positioning holes 12422*d* and are fixed by a plurality of screws 1246 and locking holes 12424*c*; however, the invention is not limited thereto. For example, the engagement of the plastic socket 12424 and the first metal frame 12422 is achieved by hooks and slots. Furthermore, in the embodiment, the side supporting portion 122 includes a second metal frame 1222. The second metal frame 1222 and the base plate portion 12422*a* of the first metal frame 12422 are fixedly connected in an L-shaped form. In practice, the first metal frame 12422 and the second metal frame 1222 are formed by single metal stamping part; however, the invention is not limited thereto. For example, the first metal frame 12422 and the second metal frame 1222 are connected by another part (e.g. by adhering with adhesive, welding, structurally engaging).

Furthermore, the front supporting portion 124 further includes a metal shell 1248. The metal shell 1248 includes a base portion 12482 and a plurality of spring strips 12484. The base portion 12482 is fixed on the first metal frame 12422. The spring strips 12484 extend outward from a perimeter of the base portion 12482 and protrude out of the plastic socket 12424. Therein, the base portion 12482 has a plurality of positioning holes 12482*a*. The positioning posts 12424*b* of the plastic socket 12424 pass through the positioning holes 12482*a*, so that the base portion 12482 is clamped on the first metal frame 12422 by the plastic socket 12424 and the base plate portion 12422*a*. In addition, in the embodiment, the side support 16 has a plurality of through holes 16*d* at the end portion 16*b*, so that when the side support 16 and the L-shaped support 12 are detachably engage with each other, the through holes 16*d* expose the corresponding spring strips 12484.

Figure 6:
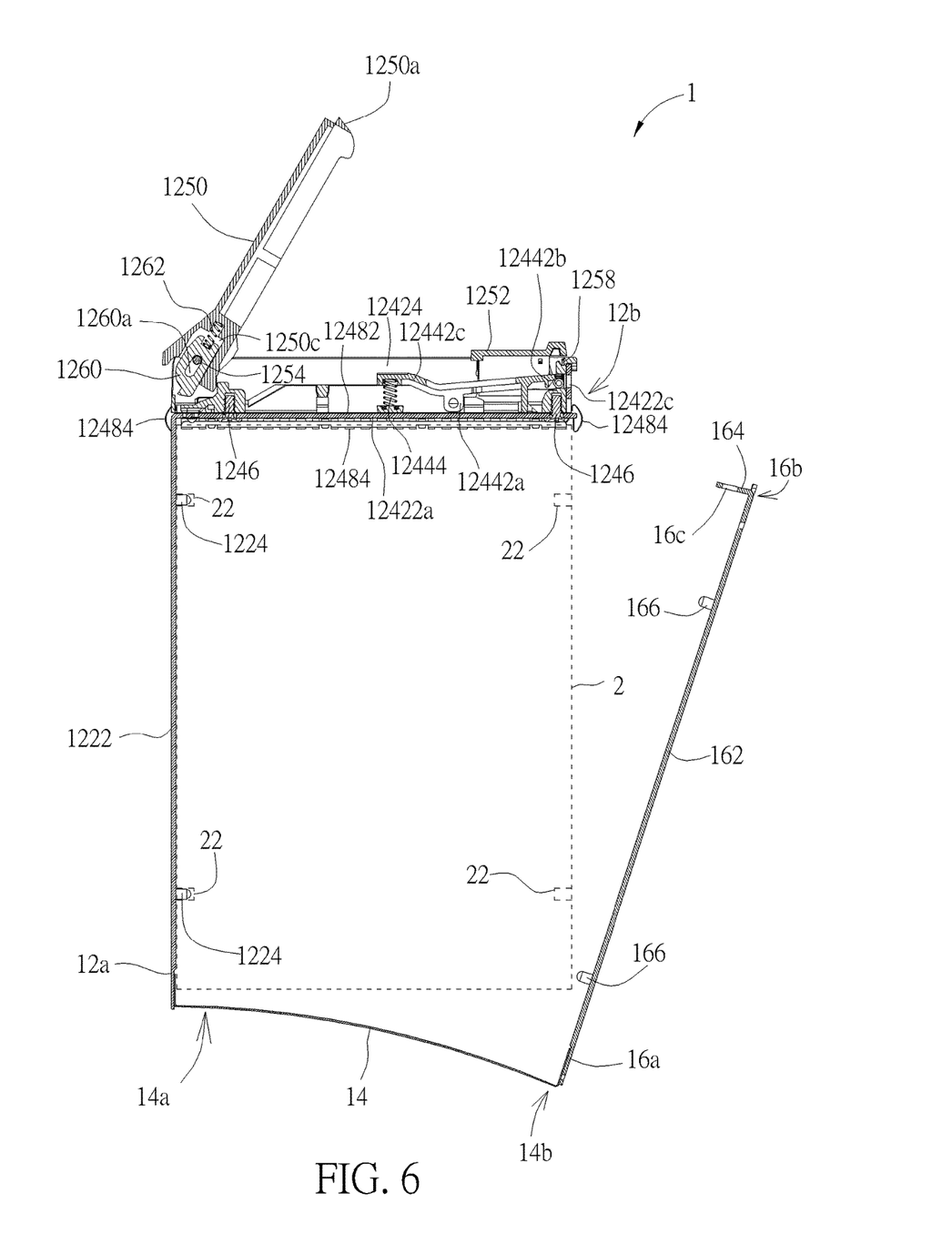
FIG. 6 is a sectional view of the removable hard disk carrier in FIG. 1 along the line X-X at the open status.

In the embodiment, when a user press the pressing portion 12442*c* of the operation part 12442 to rotate the operation part 12442 counterclockwise (relative to on the viewpoint of FIG. 6), the first engaging portion 12442*b* is disengaged from the second engaging portion 16*c*. Afterwards, the user can deflect the side support 16 rightward, so as to make the removable hard disk carrier 1 at an open status, as shown by FIG. 6. In the embodiment, the flexible support 14 is flexible on the plane of FIG. 6, so that the flexible support 14 can elastically deflect parallel to the plane. Thereby, when the user deflect the side support 16 rightward, the side support 16 and the flexible support 14 depart from the edges (i.e. one side edge and the bottom side edge) of the hard disk 2. In practice, the flexible support 14 can be realized by but not limited to a spring steel piece or a metal piece having elasticity in a certain degree. Furthermore, the flexible support 14 can be fixedly connected to the side support 16 and the second metal frame 1222 by welding; however, the invention is not limited thereto. For example, the above connection can be implemented through an additional part (e.g. a rigid L-shaped sleeve). In the embodiment, the flexible support 14 is provided in a plated shape and is disposed perpendicular to the plane of FIG. 6, so the flexible support 14 has a larger second moment of area in the direction perpendicular to the plane, so that it is difficult for the flexible support 14 to bend upward or downward (relative to the plane). Furthermore, the L-shaped support 12, the flexible support 14, and the side support 16 are arranged and connected alone the plane of FIG. 6 so as to form a quite stiff frame, which is conducive to the fixing of the hard disk 2.

Furthermore, in the embodiment, the side supporting portion 122 is disposed opposite to the side support 16. The side supporting portion 122 further includes a plurality of first posts 1224, for example, which can be formed by short metal rods riveted on the second metal frame 1222. The side support 16 also includes a plurality of second posts 166, for example, which can be formed by short metal rods riveted on the side support 16 (or the main body 162). However, the invention is not limited thereto. For example, the first posts 1224 can be formed through a drawing process on the second metal frame 1222; similarly, the second posts 166 can be formed through a drawing process on the side support 16. When the L-shaped support 12, the flexible support 14, and the side support 16 fix the hard disk 2 in the accommodating space 10, the first posts 1224 and the second posts 166 are inserted into locking holes 22 (shown in hidden lines in FIG. 6) formed on two sides of the hard disk 2. After the side support 16 deflects rightward (as shown by FIG. 6), the second posts 166 depart from the corresponding locking holes 22 of the hard disk 2, so that it is easy to shift the hard disk 2 rightward to make the first posts 1224 depart from the corresponding locking holes 22 of the hard disk 2. At the moment, the hard disk 2 can be taken out from the removable hard disk carrier 1. When a replacement hard disk is required to be installed (or the hard disk 2 is required to be installed again), the installation can be implemented by the above-mentioned operation steps in a reverse order, which will not be repeated in addition. Therefore, the hard disk 2 can be attached to or detached from the removable hard disk carrier 1 without screws and hand tools.

Figure 7:
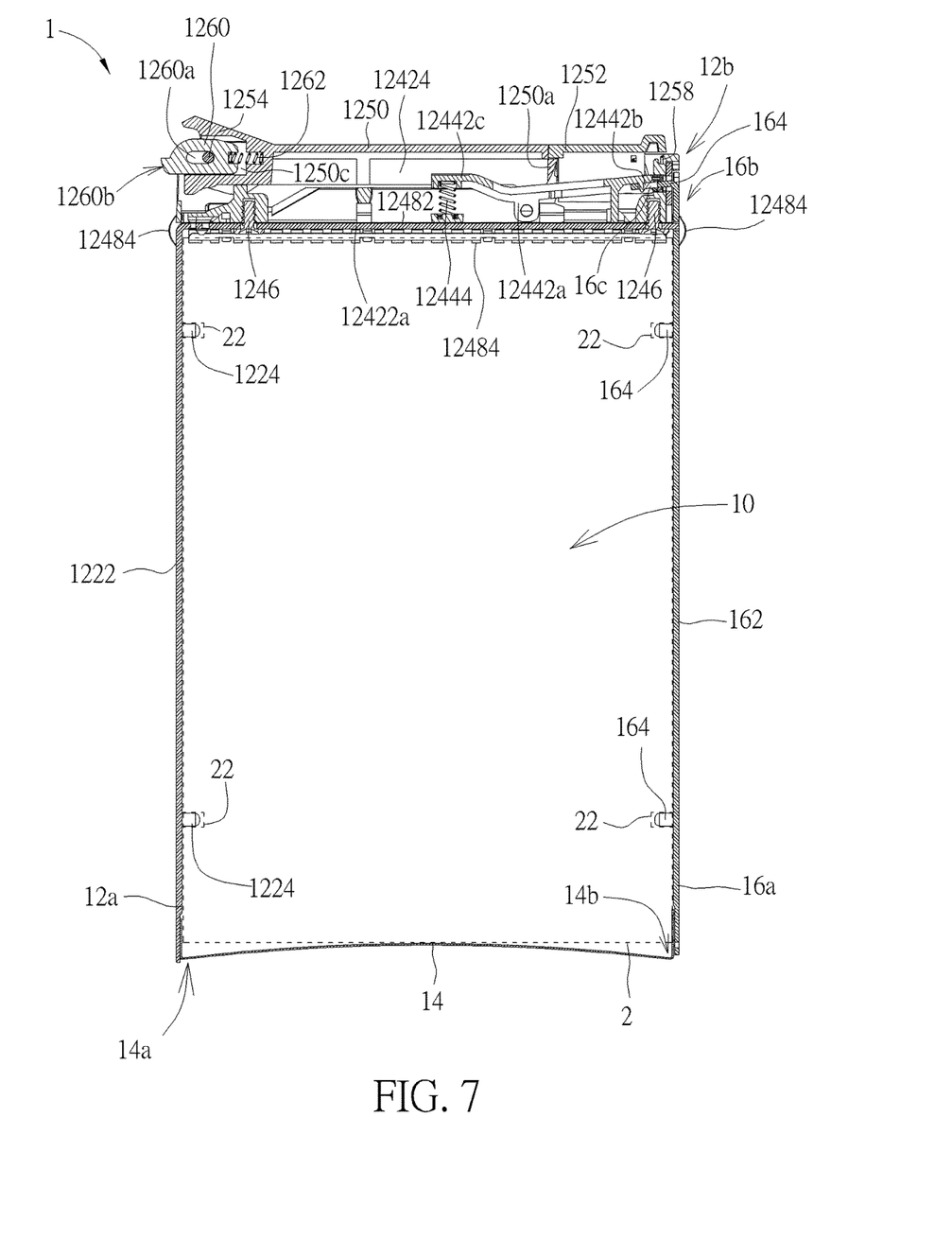
FIG. 7 is a sectional view of the removable hard disk carrier in FIG. 1 along the line X-X.

In addition, in the embodiment, the front supporting portion 124 further includes a handle 1250 and a sliding part 1252. The handle 1250 is pivotally connected to the mount 1242 (or the plastic socket 12424) through a pivot 1254. The sliding part 1252 is slidably disposed on the mount 1242 (e.g. by a slider 1252a of the sliding part 1252 sliding in a slide slot 12424d of the plastic socket 12424 with a limited slot length). As shown by FIG. 7, when the handle 1250 is rotated to the mount 1242 (i.e. closing up the handle 1250 to the mount 1242; that is, the handle 1250 is located at a close position), the sliding part 1252 can be slid to be engaged with the handle 1250 (i.e. sliding the sliding part 1252 leftward to a stop position) for preventing the handle 1250 from rotating away from the mount 1242 (i.e. the sliding part 1252 stops a distal end 1250a of the handle 1250), or the sliding part 1252 can be slid to be disengaged from the handle 1250 (i.e. sliding the sliding part 1252 rightward so as to make the sliding part 1252 not stop the distal end 1250a of the handle 1250) for allowing the handle 1250 to rotate away from the mount 1242 so that the pressing portion 12442c is exposed (e.g. by rotating the handle 1250 to an open position, as shown by FIG. 6). Furthermore, in the embodiment, the front supporting portion 124 further includes a torsion spring 1256, two ends of which abut against the mount 1242 and the handle 1250 respectively so that the handle 1250 tends to rotate away from the mount 1242. Furthermore, the front supporting portion 124 further includes another torsion spring 1258, two ends of which abut against the mount 1242 and the sliding part 1252 respectively so that the sliding part 1252 tends to slide leftward; therefore, in FIG. 7, the sliding part 1252 is located at the stop position.

Furthermore, in the embodiment, a portion of the handle 1250 corresponding to the pressing portion 12442c of the operation part 12442 is structurally solid, so when the user wants to press the pressing portion 12442c, the user needs to open the handle 1250; however, the invention is not limited thereto. For example, the handle 1250 has an opening 1250b (the disposition of which is indicated by a dashed rectangle in FIG. 1 and FIG. 2) corresponding to the pressing portion 12442c, so that when the handle 1250 is rotated to the mount 1242 (i.e. located at the close position), the pressing portion 12442c is exposed through the opening 1250b. The user can press the pressing portion 12442c without opening the handle 1250 (i.e. rotating the handle 1250 to the open position), so as to make the first engaging portion 12442b disengage from the second engaging portion 16c.

Figure 5:
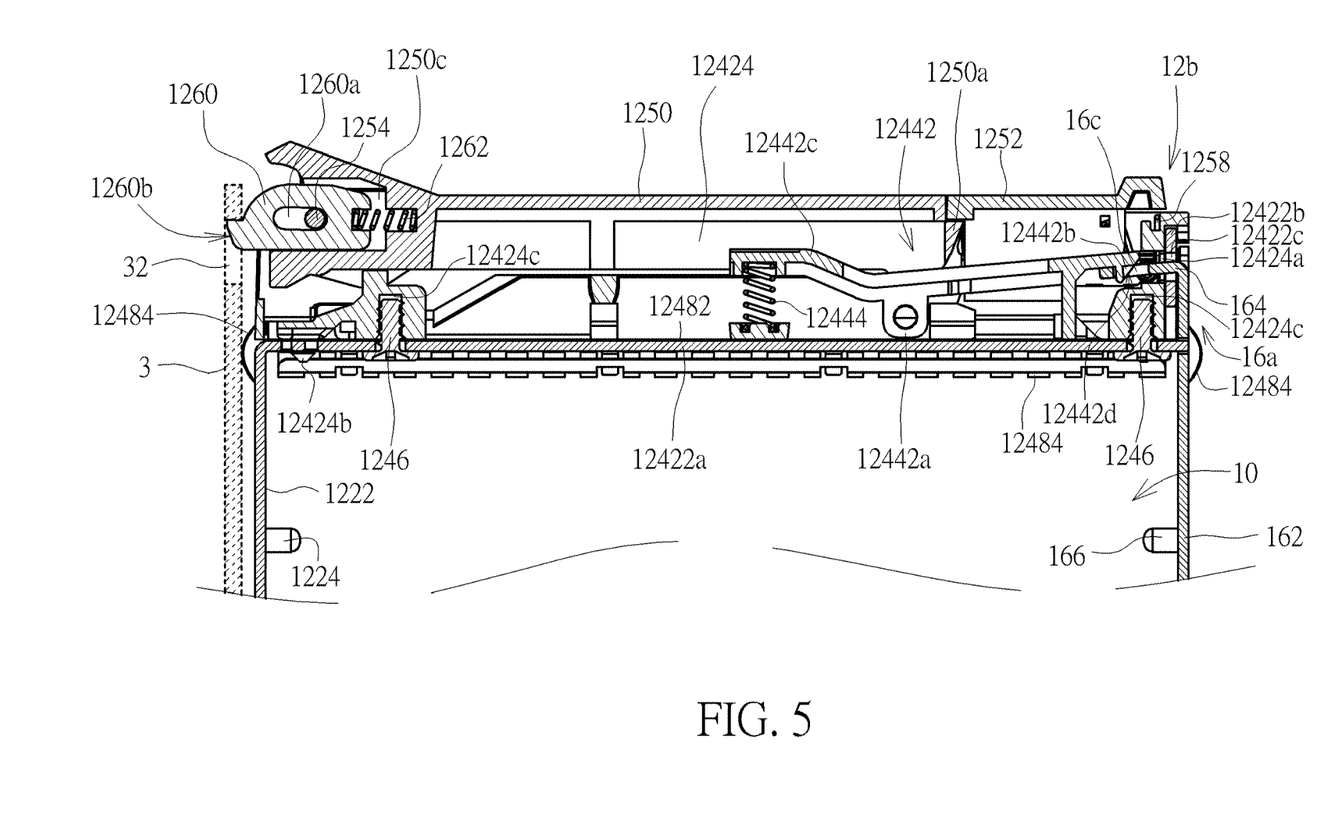
FIG. 5 is a sectional view of a portion of the removable hard disk carrier in FIG. 1 along the line X-X.

In addition, in the embodiment, the front supporting portion 124 further includes a latch 1260 and a spring 1262. The latch 1260 is slidably disposed in a slide slot 1250c of the handle 1250. The spring 1262 is disposed inside the slide slot 1250c and abuts against and between the latch 1260 and the slide slot 1250c. The latch 1260 further has a slide slot 1260a with a limited slot length. The pivot 1254 also passes through the slide slot 1260a. As shown by FIG. 5, when the handle 1250 is located at the close position, the latch 1260 is pushed by the spring 1262 to slide leftward to protrude out of the removable hard disk carrier 1 (or the side supporting portion 122), so that the latch 1260 can be engaged with an external structure (e.g. a hole 32 of an external supporting frame 3 for accommodating the removable hard disk carrier 1, as shown in dashed lines in FIG. 5). Therein, the latch 1260 has a slanted surface 1260b. When the removable hard disk carrier 1 slides toward the supporting frame 3, the supporting frame 3 can make the latch 1260 slide rightward through the slanted surface 1260b (which compresses the spring 1262 further) so as to avoid structural interference of the latch 1260 with the supporting frame 3. When the removable hard disk carrier 1 is required to be drawn out from the supporting frame 3, the handle 1250 has to be rotated away from the mount 1242 first, so as to make the latch 1260 disengage from the hole 32 of the supporting frame 3.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A removable hard disk carrier, comprising:
   an L-shaped support, comprising a side supporting portion and a front supporting portion, the side supporting portion and the front supporting portion being fixedly connected in an L-shape form, the front supporting portion comprising a mount and an engaging structure, the engaging structure being disposed on the mount, the engaging structure comprising an operation part and a restoration spring, the operation part having a pivotal connection portion, a first engaging portion, and a pressing portion;
   a flexible support, fixedly connected to an end portion of the L-shaped support; and
   a side support, fixedly connected to an end portion of the flexible support, the side support being detachably engaged with another end portion of the L-shaped support;
   wherein, when the side support and L-shaped support are engaged with each other, the L-shaped support, the flexible support, and the side support form an accommodating space therebetween and are capable of fixing a hard disk in the accommodating space.

2. The removable hard disk carrier of claim 1, wherein the pivotal connection portion is pivotally connected to the mount, the first engaging portion and the pressing portion are connected to the pivotal connection portion and located at two opposite sides of the pivotal connection portion, the restoration spring is compressed and disposed between the pressing portion and the mount, the side support has a second engaging portion, and the first engaging portion and the second engaging portion are detachably engaged with each other.

3. The removable hard disk carrier of claim 2, wherein the first engaging portion is a hook, and the second engaging portion is a slot.

4. The removable hard disk carrier of claim 2, wherein the mount comprises a first metal frame and a plastic socket, the plastic socket is held onto the first metal frame, the first metal frame has a base plate portion and a side plate portion, the side plate portion has a through hole, and the second engaging portion passes through the through hole to be detachably engaged with the first engaging portion.

5. The removable hard disk carrier of claim 4, wherein the side supporting portion comprises a second metal frame, and the second metal frame and the base plate portion of the first metal frame are fixedly connected in an L-shape form.

6. The removable hard disk carrier of claim 5, wherein the front supporting portion comprises a metal shell, the metal shell comprises a base portion and a plurality of spring strips, the base portion is fixed on the first metal frame, and the spring strips extend outward from a perimeter of the base portion and protrude out of the plastic socket.

7. The removable hard disk carrier of claim 2, wherein the front supporting portion comprises a handle and a sliding part, the handle is pivotally connected to the mount, the sliding part is slidably disposed on the mount, and when the handle is rotated to the mount, the sliding part is capable of sliding to be engaged with the handle for preventing the handle from rotating away from the mount, or the sliding part is capable of sliding to be disengaged from the handle for allowing the handle to rotate away from the mount so that the pressing portion is exposed.

8. The removable hard disk carrier of claim 7, wherein the handle has an opening, and when the handle is rotated to the mount, the pressing portion is exposed through the opening.

9. The removable hard disk carrier of claim 1, wherein the side supporting portion is opposite to the side support, the side supporting portion comprises a plurality of first posts, the side support comprises a plurality of second posts, and when the L-shaped support, the flexible support, and the side support fix the hard disk in the accommodating space, the first posts and the second posts are inserted into locking holes formed on two sides of the hard disk.

* * * * *